United States Patent
Bieck et al.

(10) Patent No.: US 9,435,700 B2
(45) Date of Patent: Sep. 6, 2016

(54) TRANSDUCER ARRANGEMENT FOR MEASURING LOAD VARIATIONS

(71) Applicant: IEE International Electronics & Engineering S.A., Echternach (LU)

(72) Inventors: Werner Bieck, Wiltingen (DE); Edmund Marx, Speicher (DE)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/893,891

(22) PCT Filed: May 20, 2014

(86) PCT No.: PCT/EP2014/060327
§ 371 (c)(1),
(2) Date: Nov. 24, 2015

(87) PCT Pub. No.: WO2014/191255
PCT Pub. Date: Dec. 4, 2014

(65) Prior Publication Data
US 2016/0116352 A1 Apr. 28, 2016

(30) Foreign Application Priority Data
May 29, 2013 (LU) .......................... 92205

(51) Int. Cl.
| G01L 1/16 | (2006.01) |
| G01L 1/22 | (2006.01) |
| G01L 5/00 | (2006.01) |
| G06F 3/0488 | (2013.01) |
| G06F 3/041 | (2006.01) |

(52) U.S. Cl.
CPC ............. *G01L 1/225* (2013.01); *G01L 1/2287* (2013.01); *G01L 5/00* (2013.01); *G06F 3/0414* (2013.01); *G06F 3/04883* (2013.01)

(58) Field of Classification Search
CPC . G06F 3/0414; G06F 3/04883; G01L 1/162; G01L 1/2268; G01L 1/225; G01L 5/00
USPC .................................. 73/760, 794, 862.794
See application file for complete search history.

(56) References Cited

U.S. PATENT DOCUMENTS

| 3,201,983 | A | * | 8/1965 | Hebert | ................ G01G 3/1414 |
| | | | | | 177/200 |
| 4,050,550 | A | * | 9/1977 | Grossner | ................... B60T 7/20 |
| | | | | | 188/112 R |
| 5,086,656 | A | * | 2/1992 | Schwendemann | ... G01G 19/035 |
| | | | | | 177/137 |
| 5,551,308 | A | * | 9/1996 | Arai | ....................... B25J 9/0006 |
| | | | | | 73/862.041 |
| 9,090,337 | B2 | * | 7/2015 | Tessier | .................... B64C 13/04 |
| 2008/0287832 | A1 | | 11/2008 | Collins et al. | |
| 2010/0063778 | A1 | | 3/2010 | Schrock et al. | |
| 2015/0088154 | A1 | * | 3/2015 | Vaitekunas | ............ A61B 17/12 |
| | | | | | 606/128 |

OTHER PUBLICATIONS

International Search Report and Written Opinion issued Oct. 28, 2014 re: Application No. PCT/EP2014/060327; pp. 1-10; citing: US 2008/287832 A1 and US 2010/063778 A1.

* cited by examiner

*Primary Examiner* — Max Noori
(74) *Attorney, Agent, or Firm* — Reising Ethington P.C.

(57) ABSTRACT

The invention relates to a transducer arrangement for converting a load variation into one or more electrical output signals. The transducer arrangement comprises at least one transducer element and an evaluation unit operatively connected to the transducer element. The transducer arrangement can be used amongst others, for healthcare applications, sport leisure activities, impact detection for safety applications in the automotive industry as well as for safety surveillance systems in the industry.

9 Claims, 4 Drawing Sheets

TRANSDUCER ARRANGEMENT FOR MEASURING LOAD VARIATIONS

TECHNICAL FIELD

The present invention generally relates to a transducer arrangement for measuring load variations. This invention more specifically relates to a transducer arrangement to be arranged inside a shoe sole or on a shoe inlay for evaluating load variations applied thereon.

BACKGROUND ART

It is known within the art that a load variation applied onto a surface or a body can be measured with the help of a transducer. A transducer converts a variation in one physical quantity, e.g. pressure, quantitatively into a variation in another physical quantity, e.g. voltage. The present invention relates to an improved transducer arrangement with transducers for converting load variations into voltage variations.

One particular embodiment of such transducers are so-called force-sensing resistors (FSRs). FSRs are well known within the art and can be used in numerous applications. Such force-sensing resistors usually include at least two electrodes with a force-sensitive material arranged there in-between. In case a load is applied onto an FSR the resistance of between the electrodes across the force-sensitive material varies. An electrical circuit coupled to the electrodes monitors the change in resistance.

According to a preferred application, FSRs can be arranged inside a shoe sole for measuring the force a person applies thereon, during walking, jumping and especially running. US 2010/0063778 reveals such a shoe sensor system with different force-sensing resistors, which are operatively connected to an electrical module. The electrical module is capable of gathering measurements from the different force-sensing resistors and of transmitting the data for further use via a communication port to an external device.

Yet, force-sensing resistors have a low speed response and can therefore only be used for measuring static loads or quasi-static load variations. They are not sufficiently precise to provide information about the user's foot anatomy or gait dynamics. This information however can be very useful in athlete monitoring or for healthcare applications, e.g. foot diagnosis and health prophylaxis.

BRIEF SUMMARY

A transducer arrangement is provided that can measure load variations more accurately.

The invention relates to a transducer arrangement for converting a load variation into one or more electrical output signals. The transducer arrangement comprises at least one transducer element and an evaluation unit operatively connected to the transducer element. The transducer arrangement can be used amongst others for healthcare applications, sport leisure activities, impact detection for safety applications in the automotive industry as well as for safety surveillance systems in the industry.

The transducer element comprises a combination of a first transducer and a second transducer. The evaluation unit comprises:
  a first evaluation circuit associated to the first transducer for converting static loads or quasi-static load variations, which comprise typical time frames of >0.1 sec, into a first output signal,
  a second evaluation circuit associated to the second transducer for converting a highly dynamic load variations, which are typically a factor 10-100 faster than quasi-static signal changes, into a second output signal, and
  an output circuit operatively connected to the first evaluation circuit and the second evaluation circuit for outputting the first electrical output signal and/or the second electrical output signal.

Thanks to this transducer arrangement, load variations are measured with higher precision.

This invention more particularly but not exclusively relates to a transducer element, wherein the first transducer or/and the second transducer is foil-based. The first transducer and the second transducer can be embodied as a multilayered arrangement of several foils, e.g. laminated together at least at specific locations thereof. Thanks to the flexibility, lightness and thinness of foils, they can be arranged on or inside a great variety of different materials.

According to a particular advantageous embodiment of the invention, the first transducer is a foil type pressure sensor. The foil type pressure sensor comprises:
  a first carrier foil,
  a second carrier foil that is kept apart from the first carrier foil by one or more spacers arranged between the first carrier foil and the second carrier foil, and
  at least two electrodes and a layer of pressure sensitive material arranged in an active area of the first transducer. The pressure sensitive material connects the first electrode and the second electrode.

In response to a load variation that is acting onto the active area, the first carrier foil approaches the second carrier foil and an electrical contact is established across the layer of pressure sensitive material between the first electrode and the second electrode so that the resistance measured between the first electrode and the second electrode changes. The spacers can be made of foam or any other material that can be compressed under pressure and that regains its initial size after the compression.

According to a preferred embodiment of the invention, the first electrode is arranged on the first carrier foil facing the second electrode arranged on the second carrier foil. A layer of pressure sensitive material covers the first and/or the second electrode in the active area of the foil type pressure sensor and connects the first electrode to the second electrode. In response to a pressure acting onto the active area of the foil type pressure sensor the first electrode approaches the second electrode and the resistance between the electrodes across the pressure sensitive material arranged there in-between varies. The variation in resistance is measured by an evaluation circuit operatively connected to the first and second electrodes.

Alternatively the first electrode and the second electrode are arranged separated one from the other on the first carrier foil, while the layer of pressure sensitive material is arranged on the second carrier foil facing the first carrier foil. The spacer is arranged between the first carrier foil and the second carrier foil, holding the first carrier foil and the second carrier foil apart one from another, when no pressure is applied onto the active area.

When a force is applied onto the active area, the first and second carrier foils are brought together and the layer of pressure sensitive material is connecting the first and the second electrodes in the active area. In response of the establishment of electrical contact the resistance between the electrodes, connected by the pressure sensitive material varies. The first carrier foil and the second carrier foil can be made out of a very thin electrical insulating material. The first transducer can be embodied as a FSR (force-sensing resistor) or any other transducer capable of measuring low dynamic load variations.

Each transducer element can be embodied as a separate unit measuring a load variation at a predefined area and transmitting one or more electrical output signals to an output circuit. According to a preferred embodiment of the invention, a plurality of transducer elements can be arranged spatially separated one from another. This is advantageous since the elements can be placed in a specific section, where load measurements are required. In some cases, it is required to measure high-dynamic load variations only in specific sections of the first transducer. Hence, multiple transducer elements can use one common first transducer or/and second transducer.

The second transducer can advantageously be an electret based pressure sensor or, alternatively, with less dynamic range, a piezoelectric pressure sensor comprising a sensing foil. The sensing foil can have an anode and a cathode with an electret based material or a piezoelectric material arranged in-between the anode and the cathode. Preferably, the anode and cathode are connected to the second evaluation circuit. Such electret-based or, with less sensitivity, piezoelectric sensors are capable of measuring high dynamic load variations.

According to one embodiment of the invention, the first transducer and the second transducer are arranged one above the other. The first transducer and the second transducer can be very thin, such that a load applied onto one of the transducers is automatically applied onto both transducers.

Furthermore, the first carrier foil or/and the second carrier foil comprises the sensing foil. The first carrier foil or/and the second carrier foil of the first transducer can be replaced entirely by the sensing foil.

According to a different embodiment of the invention, the one or more spacers comprise the sensing foil. The sensing foil can replace the one or more spacers partly or entirely.

Preferably, the first evaluation circuit comprises a R-circuit and the second evaluation circuit comprises a R-C-circuit. The low-dynamic load variation is evaluated by the R-circuit and outputted as a first change in voltage of the first output signal over the time period Δt, and the high-dynamic load variation is evaluated by the R-C-circuit and outputted as a second change in voltage of the second output signal over the time period Δt. Thanks to the separation between the first evaluation circuit and the second evaluation circuit, the first transducer and the second transducer operate in their optimal conditions. The low-dynamic load variation and the high-dynamic load variation can be measured simultaneously or sequentially.

According to a preferred embodiment of the invention, the evaluation unit comprises a central processing unit. The output circuit is, in operating state, directly or wirelessly coupled to the central processing unit. The output circuit can connect via a wireless communication, e.g. Bluetooth, Wireless Local Area Network or infrared to a smartphone, a personal computer or any other electronic device and transmit the processed first and second electrical output signals. This may be particularly advantageous for athlete monitoring to indicate proper (healthy) foot loading while a person is running, walking or jumping.

BRIEF DESCRIPTION OF THE DRAWINGS

Preferred embodiments of the invention will now be described, by way of example, with reference to the accompanying drawings in which:

FIG. 3 is a schematic view of a shoe inlay assembly of a sensor arrangement in accordance with a second preferred embodiment of the invention.

FIG. 5 is a schematic view of a shoe inlay assembly of a sensor arrangement in accordance with a third preferred embodiment of the invention.

DETAILED DESCRIPTION

The particularly advantageous but not limiting embodiments of the invention, which will be described with reference to the figures, relate to a transducer arrangement embodied as a shoe inlay to measure a load applied thereon. The shoe inlay can be inserted into a sport shoe for athlete monitoring to measure proper foot load conditions versus athletic performance such as speed, distance or/and acceleration of the person wearing it. Alternatively the transducer arrangement can be arranged directly onto or into the shoe sole. The transducer arrangement converts the load variation applied onto the transducer elements over multiple stages into electrical output signals. For each transducer element the load applied thereon is converted into two electrical output signals.

Figure 1:
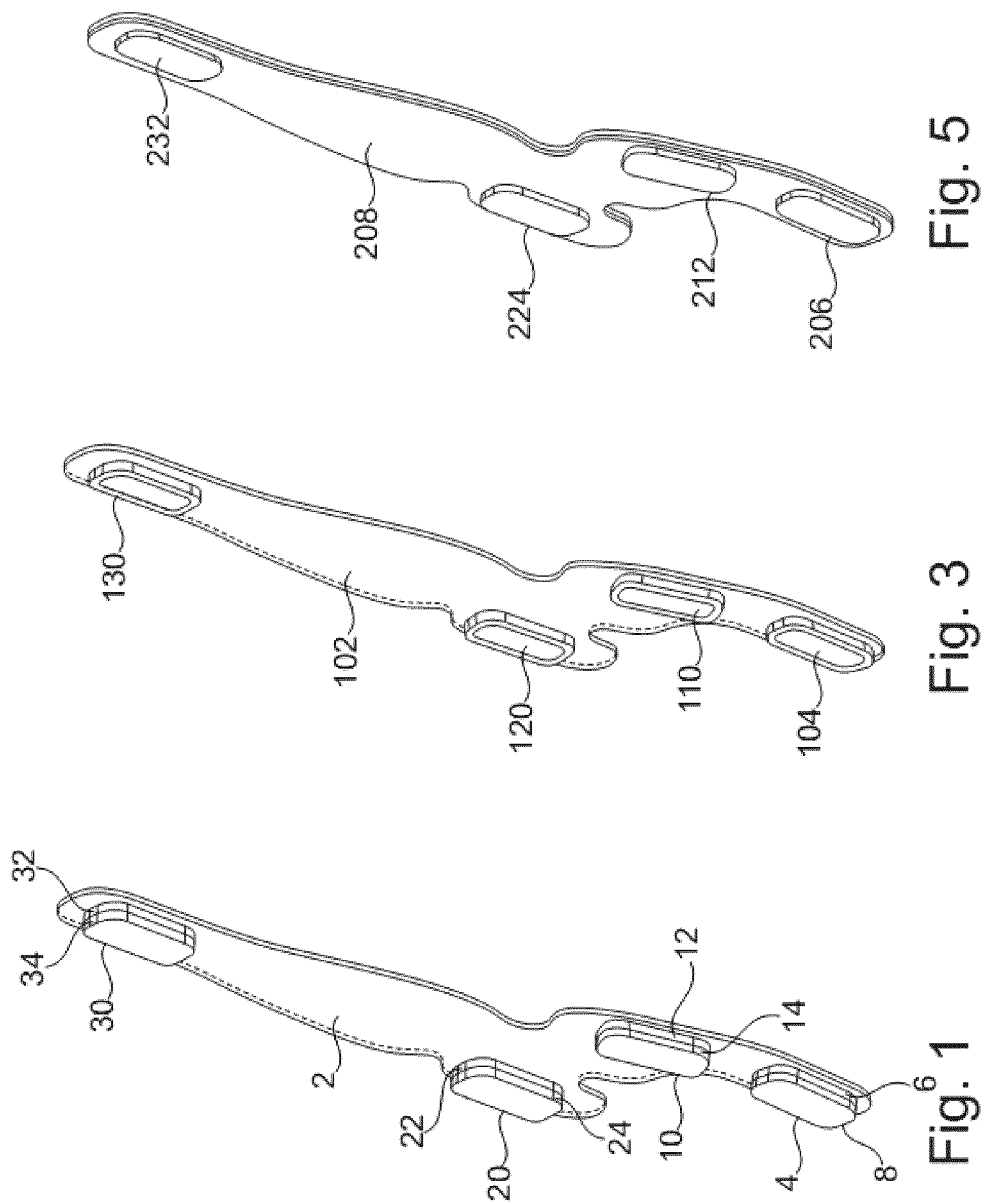
FIG. 1 is a schematic view of a shoe inlay assembly of a sensor arrangement in accordance with a first preferred embodiment of the invention.
Figure 2:
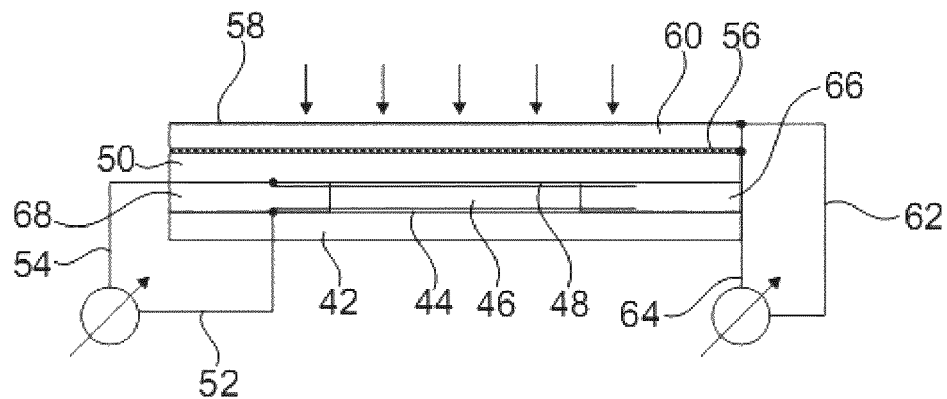
FIG. 2 is a cross-sectional view of a sensor element in accordance with a first preferred embodiment of the invention.

In the embodiment of FIG. 1 multiple transducer elements 4, 10, 20, 30 are arranged on a common carrier foil 2, such that they cover the foot areas of maximum load variations. The carrier foil 2 has a shape similar to the contact surface of the foot and is made of a film of flexible electrical insulating material. One transducer element 4 is arranged in the toe area of the foot, two transducer elements 10, 20 are arranged close to the mid-section of the foot, where the metatarsals connect to the phalanges, and one transducer element 30 is arranged close to the heel area of the foot. In addition to the transducer elements 4, 10, 20, 30 other transducer elements can be used in other areas of the shoe, where an accurate measurement of load variations is required. In order to cope with anthropometric variations in foot anatomy each transducer element 4, 10, 20, 30 is preferably oval-shaped having rounded edges with a radius of 6 mm and each transducer element 4, 10, 20, 30 has a width of 20 mm and a length of 30 mm. The transducer elements 4, 10, 20, 30 are very thin and can thus be arranged inside a shoe without hindering the person wearing it.

The definitions of bottom and top will be used hereinafter to describe the layer arrangement of the transducer elements shown in FIG. 1 to FIG. 6. The top layer refers to the layer closest to the surface a person's foot contacts and the bottom layer refers to the layer closest to the shoe sole. The definition of top and bottom is added for intelligibility and cannot be regarded as limiting the scope of the invention. Since the transducer elements measure a load variation, it should be regarded as obvious, that the transducer elements deliver similar results when being turned-over.

The transducer arrangement as shown in the attached figures is particularly advantageous since it is capable of capturing high dynamic load variations and low dynamic load variations separately. Each of the transducer elements therefore comprises a first transducer for measuring low dynamic load variations and a second transducer for measuring high dynamic load variations. The high dynamic load variations and the low dynamic load variations are evaluated by using two separate evaluation circuits. One evaluation circuit is associated to the first transducer and one evaluation circuit is associated to the second transducer The first transducer is combined with a second transducer according to three advantageous embodiments of the transducer arrangement mentioned hereafter. According to a first transducer arrangement in FIG. 1 and FIG. 2, the second transducer is arranged on top of the first transducer. In a second embodiment, illustrated in FIG. 3 and FIG. 4 the spacer of the first transducer is partly replaced by a second transducer. In a third embodiment in FIG. 5 and FIG. 6 the bottom carrier foil of the first transducer is replaced with the second transducer.

The first transducer 6, 12, 22, 32 is a foil type pressure sensor having a first carrier foil 42 at the bottom, which corresponds to the first carrier foil 2 in FIG. 1. A first electrode 44 is applied onto the first carrier foil 42. A pressure sensitive material 46, such as a force-sensitive resistive material, is arranged on the top surface of the first carrier foil 42. The pressure sensitive material 46 separates the first electrode 44 from the second electrode 48. The second electrode 48 is applied on the second carrier foil 50 facing the first electrode 44. Spacers 66, 68 are made e.g. of a foam material or a polymer film material, circumferentially arranged around the active area of the first transducer to keep the first carrier foil 42 at a certain distance from the second carrier foil 50. In response to a low dynamic load variation that is acting onto the active area of the first transducer, the first carrier foil 42 approaches the second carrier foil 50 and the resistance between the first electrode 44 and the second electrode 48 changes. This resistance is preferably measured by a first evaluation circuit operatively connected to the first electrode 44 and the second electrode 48 via the leads 52, 54.

According to the first transducer arrangement, the second transducers 8, 14, 24, 34 are arranged on top of the first transducer 6, 12, 22, 32. The second transducer in FIG. 2 comprises an electret material 60, with quasi-permanent electrostatic dipoles. The electret material 60 is arranged in the active area between the anode 56 and the cathode 58. The anode 56 and the cathode 58 are operatively connected via the leads 64 and 62 respectively to the second evaluation circuit. If a load is applied onto the transducer element 4 in FIG. 1, the capacitance of the electret material and the resistance between the electrodes across the pressure sensitive material changes. The first evaluation circuit measures the change in resistance between the electrodes. The change in capacitance of the electret material is measured by the second evaluation circuit.

Figure 4:
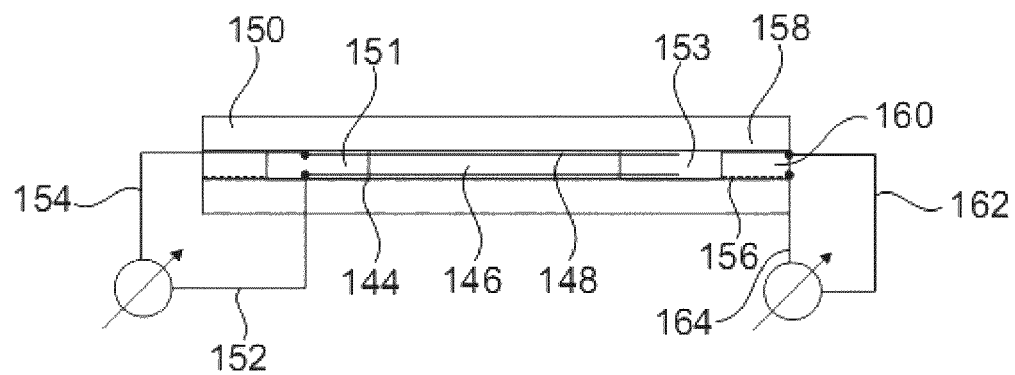
FIG. 4 is a cross-sectional view of a sensor element in accordance with a second preferred embodiment of the invention.
Figure 6:
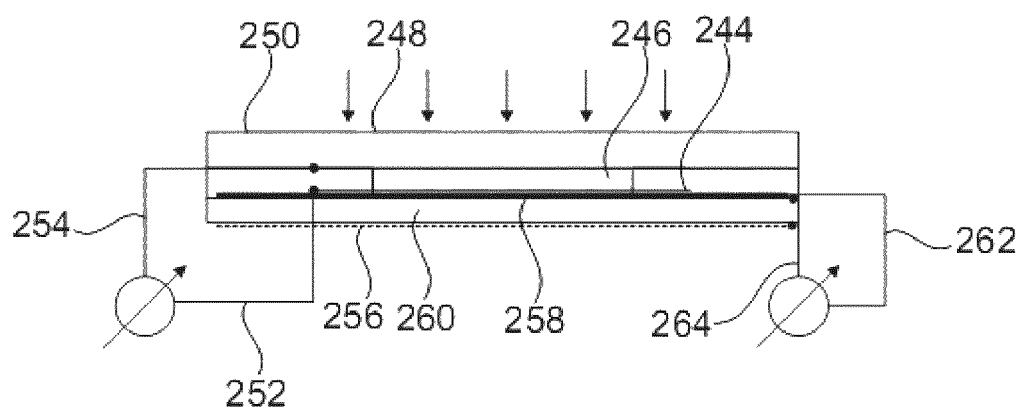
FIG. 6 is a cross-sectional view of a third sensor element in accordance with a third preferred embodiment of the invention.

Similar to the first embodiment of the transducer arrangement, the second embodiment of the transducer arrangement as shown in FIG. 3 comprises four transducer elements 104, 110, 120, 130 arranged on the bottom carrier foil 102 of the first transducers in the areas of maximum load variation. Each transducer element comprises the first transducer of the first embodiment with a second transducer that partly replaces the spacers. FIG. 4 is a cross-sectional view of one of the transducer elements 104, 110, 120, 130. The second transducer comprises an electret 160, arranged in-between an anode 156 and a cathode 158. The leads 154 and 152 operatively connect the foil electrodes 144, 148 to the first evaluation circuit. The spacer of the first transducer is partly replaced by a circumferential electret 160 arranged between the electrode foils 144, 148 and the anode 156, cathode 158. The second transducer has approximately the same thickness as the spacers 151, 153 of the first transducer. The leads 162, 164 operatively connect the cathode 158 and the anode 156 to a second evaluation circuit.

The third embodiment of a transducer arrangement as shown in FIG. 5 comprises a transducer element having four first transducers 206, 212, 224, 232 and one common second transducer 208. The second transducer has a shape similar to the contact surface of the foot and carries the four first transducers. The second transducer replaces the first carrier foil of the first transducer. Leads 262, 264 connect the anode 256 and the cathode 258 to the second evaluation circuit. Each of the electrodes 244, 248 is operatively connected via a lead 252, 254 to a second evaluation circuit. The dimensions of the first transducers 206, 212, 224, 232 are equal to the dimensions of the transducer elements 4, 10, 20, 30, 104, 110, 120, 130 of the first and the second preferred embodiment of the invention.

The first and the second evaluation circuits for each of these three embodiments of the invention are necessary to distinguish between the different forms of locomotion of a person on land, e.g. jumping, walking, running and stamping. In a possible embodiment, the first transducer is integrated as a resistor into an R-circuit. The voltage of the R-circuit is measured by the first evaluation circuit and outputted to an output circuit as a first output signal. By applying a load onto the first transducer, the first and second carrier foils are pressed together and the resistance across the force-sensitive resistive material changes. Since foil-based force-sensing resistors are only capable of reliably measuring static loads or quasi-static load variations, a first change in voltage therefore is proportional to the quasi-static load applied onto the active area of the first transducer.

The second evaluation circuit only detects the high-dynamic load variations by measuring the change in capacitance of the electret material. Thus, the second transducer element is integrated as a capacitor into a RC-circuit. The voltage of the RC-circuit is measured by the second evaluation circuit and outputted to an output circuit as a second output signal. The electret material has a quasi-permanent electric charge or dipole polarization. As the load applied onto the electret changes, the distance between the anode and the cathode changes. This change in distance results in a change in capacitance, which is monitored by measuring the voltage of the second output circuit.

In FIGS. 7 to 10, the output circuit monitors the first output signals 302, 402, 502, 602 and the second output signals 304, 404, 504, 604 simultaneously over a time period Δt of 1 s. Each figure corresponds to a load variation a person applies onto one transducer element of the transducer arrangement while carrying out a specific movement.

Figure 7:
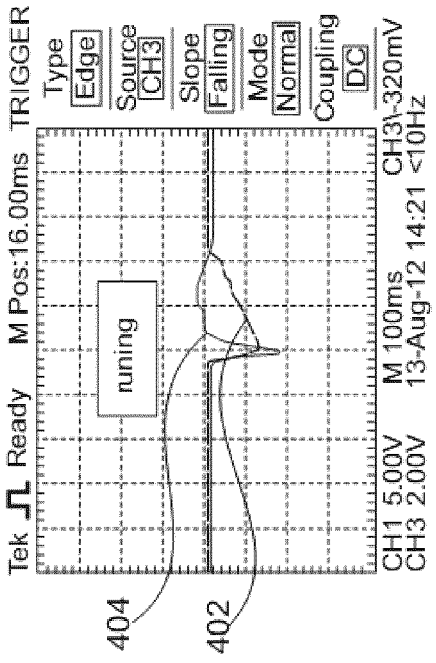
FIG. 7 is a record of a simultaneously recorded high dynamic load variation and a low dynamic load variation over a time period of 1 second applied onto the sensor arrangement for a person while walking.

The first output signal 302 and the second output signal 304 in FIG. 7 correspond to a load variation applied onto a transducer element by a person while walking.

Figure 8:
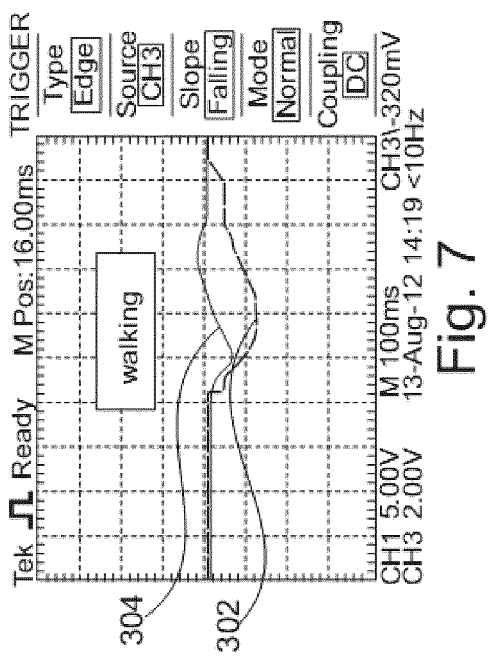
FIG. 8 is a record of a simultaneously recorded high dynamic load variation and a low dynamic load variation over a time period of 1 second applied onto the sensor arrangement for a person while running.

The first output signal 402 and the second output signal 404 in FIG. 8 correspond to a load variation applied onto a transducer element by a person while running.

Figure 9:
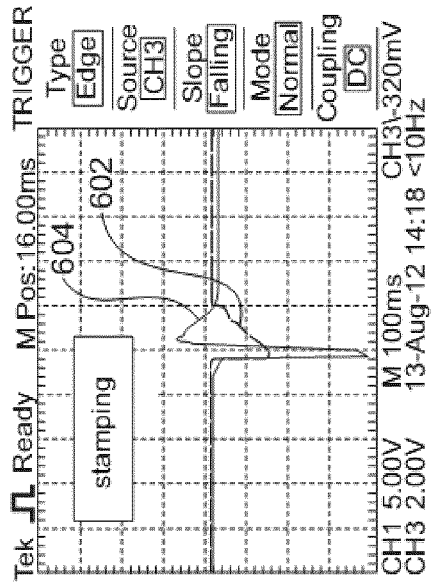
FIG. 9 is a record of a simultaneously recorded high dynamic load variation and a low dynamic load variation over a time period of 1 second applied onto the sensor arrangement for a person while landing after a jump.

The first output signal 502 and the second output signal 504 in FIG. 9 correspond to a load variation applied onto a transducer element by a person while landing after a jump.

Figure 10:
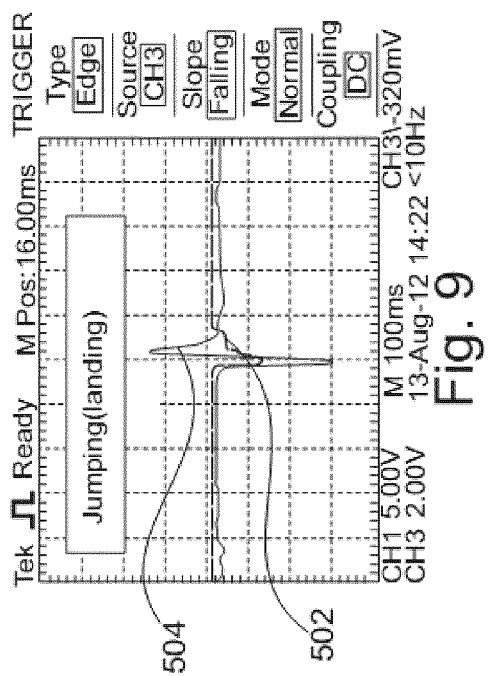
FIG. 10 is a record of a simultaneously recorded high dynamic load variation and a low dynamic load variation over a time period of 1 second applied onto the sensor arrangement for a person while stamping.

The first output signal 602 and the second output signal 604 in FIG. 10 correspond to a load variation applied onto a transducer element by a person while stamping.

Figure 11:
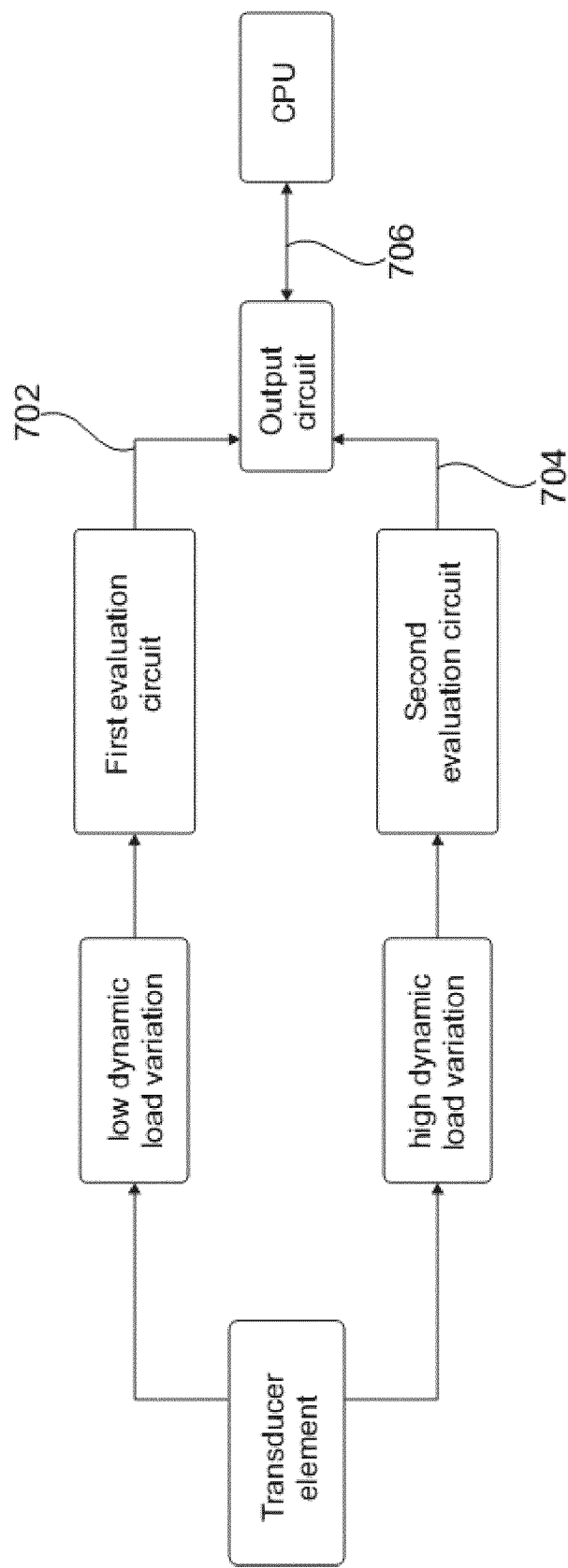
FIG. 11 is a schematic arrangement of the different components of one sensor arrangement.

For each load variation the voltage of the first output signals 302, 402, 502, 602 differs from the voltage of the second output signals 304, 404, 504, 604. The second transducer (with the corresponding second output signals 304, 404, 504, 604) has a shorter reaction time than the first transducer (with the corresponding first output signals 302, 402, 502, 602). The combination of the first output signal and the second output signal enhances the sensing capabilities by providing complementary dynamic and static plantar load information for further analysis. As illustrated in FIG. 11, a first output signal 702 and a second output signal 704 can be processed by a central processing unit. In this preferred embodiment the first and the second output signals of the output circuit are transferred via a Bluetooth 706 to a CPU.

The voltage variation over time of the first output signals 402, 502, 602 is quite similar for three different load variations. Therefore, it is difficult to assign each of the output signals to one of the load variations without taking the low dynamic load variations into account. Furthermore the second output signals 504, 604 mostly comprise peaks of short duration and are thus difficult to associate to one specific load variation. Since a high dynamic load variation is measured in addition to a low dynamic load variation, the invention is particularly advantageous. Each load variation is a combination of the first output signal and a second output signal. By combining the first output signal with the second output signal the load variation can be measured more accurately.

The invention claimed is:

1. A transducer arrangement for converting a load variation into one or more electrical output signals, said transducer arrangement comprising:
    at least one transducer element, and
    an evaluation unit operatively connected to said transducer element,
wherein said transducer element comprises a combination of a first transducer and a second transducer, and
wherein said evaluation unit comprises:
    a first evaluation circuit associated to said first transducer for converting static load or quasi-static load variations into a first output signal,
    a second evaluation circuit associated to said second transducer for converting a highly dynamic load variations into a second output signal, and
    an output circuit operatively connected to said first evaluation circuit and said second evaluation circuit for outputting at least one of said first electrical output signal and said second electrical output signal.

2. A transducer arrangement according to claim 1, wherein at least one of said first transducer and said second transducer is foil-based.

3. A transducer arrangement according to claim 1, wherein said first transducer is a foil type pressure sensor comprising:
    a first carrier foil,
    a second carrier foil being kept apart from said first carrier foil by one or more spacers arranged between said first carrier foil and said second carrier foil, and
    at least two electrodes and a layer of pressure sensitive material arranged in an active area of said first transducer, said pressure sensitive material connecting said first electrode and said second electrode;
wherein in response to a low dynamic load variation acting onto said active area, said first carrier foil approaches said second carrier foil changing said resistance measured between said first electrode and said second electrode.

4. A transducer arrangement according to claim 1, wherein said second transducer is an electret based pressure sensor or a piezoelectric pressure sensor, said electret based pressure sensor or said piezoelectric pressure sensor comprising a sensing foil.

5. A transducer arrangement according to claim 1, wherein said first transducer and said second transducer are arranged one above the other.

6. A transducer arrangement according to claim 3, wherein at least one of said first carrier foil and said second carrier foil comprises said sensing foil.

7. A transducer arrangement according to claim 3, wherein said one or more spacers comprises said sensing foil.

8. A transducer arrangement according to claim 3, wherein said first evaluation circuit comprises a R-circuit and said second evaluation circuit comprises a R-C circuit:
    said low dynamic load variation being evaluated by said R-circuit and outputted as a first change in voltage of said first output signal over said time period Δt, and
    said high dynamic load variation being evaluated by said R-C circuit and outputted as a second change in voltage of said second output signal over said time period Δt.

9. A transducer arrangement according to claim 1, wherein said evaluation unit comprises a central processing unit, said output circuit being, in operating state, directly or wirelessly coupled to a central processing unit, said central processing unit processing said first electrical output signal and said second electrical output signal.

* * * * *